(12) United States Patent
Richter et al.

(10) Patent No.: US 10,619,024 B2
(45) Date of Patent: Apr. 14, 2020

(54) POLYFUNCTIONAL ALCOHOLS AS CROSS-LINKERS IN PMI FOAMS

(71) Applicant: Evonik Operations GmbH, Essen (DE)

(72) Inventors: Thomas Richter, Darmstadt (DE); Thomas Barthel, Heppenheim (DE); Lars Bork, Weiterstadt (DE); Christoph Seipel, Babenhausen (DE); Kay Bernhard, Cheshire, CT (US)

(73) Assignee: Evonik Operations GmbH, Darmstadt (DE)

( * ) Notice: Subject to any disclaimer, the term of this patent is extended or adjusted under 35 U.S.C. 154(b) by 0 days.

(21) Appl. No.: 15/759,576

(22) PCT Filed: Sep. 6, 2016

(86) PCT No.: PCT/EP2016/070917
§ 371 (c)(1),
(2) Date: Mar. 13, 2018

(87) PCT Pub. No.: WO2017/045965
PCT Pub. Date: Mar. 23, 2017

(65) Prior Publication Data
US 2019/0153186 A1 May 23, 2019

(30) Foreign Application Priority Data

Sep. 15, 2015 (EP) .................... 15185179

(51) Int. Cl.
| | | |
|---|---|---|
| *C08J 9/10* | (2006.01) | |
| *C08J 9/14* | (2006.01) | |
| *C08J 9/228* | (2006.01) | |
| *C08J 9/00* | (2006.01) | |
| *C08J 9/04* | (2006.01) | |
| *C08J 9/16* | (2006.01) | |
| *C08F 220/44* | (2006.01) | |
| *C08K 5/053* | (2006.01) | |

(52) U.S. Cl.
CPC ............ *C08J 9/142* (2013.01); *C08F 220/44* (2013.01); *C08J 9/0023* (2013.01); *C08J 9/0061* (2013.01); *C08J 9/04* (2013.01); *C08J 9/102* (2013.01); *C08J 9/16* (2013.01); *C08J 9/228* (2013.01); *C08K 5/053* (2013.01); *C08J 2201/026* (2013.01); *C08J 2201/03* (2013.01); *C08J 2205/10* (2013.01); *C08J 2207/00* (2013.01); *C08J 2333/24* (2013.01); *C08J 2333/26* (2013.01); *C08J 2400/104* (2013.01)

(58) Field of Classification Search
CPC ...... C08F 220/44; C08J 9/0023; C08J 9/0061; C08J 9/04; C08J 9/16; C08J 9/228; C08J 2201/026; C08J 2205/10; C08J 2333/24; C08J 2400/104
See application file for complete search history.

(56) References Cited

U.S. PATENT DOCUMENTS

| | | | |
|---|---|---|---|
| 4,187,353 A | | 2/1980 | Schroeder |
| 5,698,605 A | | 12/1997 | Krieg et al. |
| 5,928,459 A | | 7/1999 | Geyer et al. |
| 6,670,405 B1 | | 12/2003 | Servaty et al. |
| 7,169,339 B2 | | 1/2007 | Stein et al. |
| 8,722,751 B2 | | 5/2014 | Scherble et al. |
| 9,212,269 B2 | | 12/2015 | Bernhard et al. |
| 9,260,599 B2 | | 2/2016 | Buehler et al. |
| 2007/0077442 A1* | | 4/2007 | Scherble .............. B32B 5/18 428/473.5 |

FOREIGN PATENT DOCUMENTS

| | | |
|---|---|---|
| CN | 100420702 C | 9/2008 |
| CN | 102020821 A | 4/2011 |
| CN | 103146109 A | 6/2013 |
| DE | 27 26 260 C2 | 5/1983 |
| DE | 197 17 483 C2 | 5/2000 |
| EP | 0 791 621 A2 | 8/1997 |
| EP | 1 678 244 | 7/2006 |
| JP | 2006-45532 A | 2/2006 |

OTHER PUBLICATIONS

U.S. Appl. No. 13/996,552, dated Jun. 21, 2013, U.S. Pat. No. 2013/0281561 A1, Kay Bernhard et al.

* cited by examiner

*Primary Examiner* — Irina S Zemel
(74) *Attorney, Agent, or Firm* — Oblon, McClelland, Maier & Neustadt, L.L.P.

(57) ABSTRACT

The invention relates to the production of PMI foams, more particularly to their formulating ingredients, which lead to particular facility in adjusting the density at given foaming temperature.

10 Claims, No Drawings

POLYFUNCTIONAL ALCOHOLS AS CROSS-LINKERS IN PMI FOAMS

FIELD OF THE INVENTION

The invention relates to the production of PMI foams, more particularly to their formulating ingredients, which lead to particular facility in adjusting the density at given foaming temperature.

PRIOR ART

Poly(meth)acrylimide (PMI) foams based on (meth)acrylic acid and (meth)acrylonitrile are known for their high compressive strength and temperature stability. The standard way of producing these foams is through polymerization of the corresponding monomers in the presence of blowing agents and other required additives, in the form of cast slabs, which are foamed by temperature treatment after polymerization has taken place.

The density of the corresponding end-product foams sold commercially is situated in general in the range from 25 to 400 kg/m$^3$. For a given blowing agent composition, the resulting density of the foam after foaming is dependent on the foaming temperature. The relationship here is that the density falls with increasing foaming temperature and rises with decreasing foaming temperature.

Thus, DE 27 26 260 describes the production of poly(meth)acrylimide foams (PMI foams) which have excellent mechanical properties that are retained at high temperatures. The foams are produced by the casting process, i.e. the monomers and additional substances required are mixed and polymerized in a chamber. In a second step, the polymer is foamed by heating. A disadvantage of the foams described in DE 27 26 260 is their coarse pore structure. The pore size can be reduced considerably simply by varying the blowing agents.

The use of crosslinkers in PMI foams with the aim of realizing particularly fine-pored foams is described in EP 1 678 244 and elsewhere. Here, the effect of the crosslinker on the thermomechanical properties, such as the heat distortion resistance, and also on foam homogeneity is emphasized. Possible crosslinkers described are polyunsaturated monomers, such as diethylene glycol diacrylate or dimethacrylate or allyl (meth)acrylate, or else ionic crosslinkers, such as polyvalent metal cations, which form ionic bridges between the acid groups of the copolymers.

DE 197 17 483 describes a method for producing polymethacrylimide foams admixed with 1-5 wt %, based on the monomer mixture, of MgO in the capacity of ionic crosslinker. The resulting foams have significantly improved thermomechanical properties.

CN 103554354 describes the use of N,N'-4,4'-diaminodiphenylmethanebismaleimide (BMI) in PMI foams. The objective there is to produce foams having high densities. Crosslinkers described in that case are, again, polyunsaturated monomers and ionic crosslinkers, especially Mg ions.

Mechanically stable PMI foams crosslinked with allyl methacrylate are found in EP 356 714. An example of a radical initiator used is azobisisobutyronitrile; the mixture for polymerization is admixed with 0.1 wt % to 10 wt % of electrically conductive particles. The same is true of the PMI foams disclosed in JP 2006 045532, which are crosslinked ionically with metal salts.

Many of the methods described for PMI foams can also be transposed in principle to the production of polyacrylimide (PI) foams. PI foams of this kind based on methacrylic acid and acrylonitrile are described in CN 100420702C, for example.

As described, for a given composition and amount of the blowing agents, the density of PMI foams is dependent on the foaming temperature. But different types of PMI foams, as sold for example under the product name Rohacell® by EVONIK Industries AG, differ in their blowing agent composition. Accordingly, they also differ in their foaming temperatures to achieve the same density.

For efficient production of PMI foams, therefore, it would be desirable if different types of PMI foams with compositions varying from one another or with different blowing agent compositions could be produced at the same foaming temperature while giving identical densities. This would simplify the production operations significantly, removing the need for the temperature resetting of the foaming oven.

Problem

A problem addressed by the present invention, therefore, was that of developing a method with which the dependency relationships in the foaming of P(M)I between blowing agent composition, foaming temperature and resulting density to decouple from one another.

A particular problem for the present invention was to use this method to enable the same density of the PMI foam to be obtained even for identical foaming temperature but different blowing agent composition.

An alternative problem for the present invention was to provide a method with which different foam densities are obtained for identical foaming temperature and identical blowing agent composition.

Solution

The problems have been solved by an innovative method for producing a foam, or rigid foam, of poly(meth)acrylimide, said method being characterized in that a mixture comprising (meth)acrylonitrile, (meth)acrylic acid, a polyol having between 2 and 10, preferably between 2 and 4, hydroxyl groups, at least one initiator and at least one blowing agent is polymerized to form a slab or a powder, is optionally temperature-conditioned, and then is foamed at a temperature between 120 and 300° C.

The amount of polyols in the mixture is preferably selected such that the hydroxyl number of the mixture is between 0.0008 and 0.2 mol of OH groups/100 g of polymer, preferably between 0.001 and 0.1 mol of OH groups/100 g of polymer.

The polyol is preferably a diol. Particularly preferred examples of such a diol are ethylene glycol, 1,10-decanediol, beta-hydroxyalkylamides, OH telechelic polytetrahydrofuran having an average molar mass between 500 and 8000 g/mol, and also OH-telechelic polyolefins, polycarbonates, polyoxymethylenes, polyethylene glycols, polypropylene glycols or polyesters each having a molar mass between 200 and 10 000 g/mol. It is of course also possible to use other alkyl diols having up to 20 carbon atoms.

Examples of higher polyols which can be used just the same are glycerol, pentaerythritol, xylitol, alditols or other sugar alcohols. It is of course also possible to make use, for example, of branched polyolefins, polyethylene glycols, polypropylene glycols, polyglycerols or polyesters having more than two hydroxyl groups.

In accordance with the invention, the polyols act specifically as crosslinkers during foaming, but also have the advantageous feature that in the preceding polymerization or at the temperature-conditioning stage, contrary to the crosslinkers known from the prior art, they do not enter into any crosslinking reaction. The crosslinking reaction here takes place, with accompanying esterification, with acid groups or optionally anhydride groups or imide groups that are present on the polymer chain.

It has been determined that the crosslinking does not occur until during foaming, i.e. at temperatures above 120° C. Crosslinking that occurs prior to foaming can lead to rupturing of the foam, since foaming is excessively hindered.

Through the use of the polyols it has been possible, surprisingly, to achieve very effective adjustment to the density of the resulting foams for identical blowing agent composition. With identical polyol, identical blowing agent composition and identical foaming temperature, an increase in the density of the resulting PMI foam was found when the amount of the polyols used was increased.

The essential advantages of the method of the invention are as follows:
  More effective and more precise adjustability of foam density
  No disadvantages of preliminary crosslinking of the polymer prior to foaming, especially in relation to foam homogeneity
  No foam rupture on foaming, especially on foaming with particularly low density (high degree of foaming)
  The Polymer The wording "(meth)acrylic acid" stands for methacrylic acid, acrylic acid or mixtures of the two. The wording "(meth)acrylonitrile" stands for methacrylonitrile, acrylonitrile or mixtures of the two. Similar comments apply in respect of wording such as "alkyl (meth)acrylate". This wording stands for the alkyl esters of methacrylic acid, of acrylic acid or of mixtures of the two.

To produce the polymer, in the form of a cast polymer, for example, a first step is the preparation of monomer mixtures which comprise as their major constituents (meth)acrylic acid and (meth)acrylonitrile, preferably in a molar ratio between 2:3 and 3:2. It is also possible to use other comonomers, for example esters of acrylic or of methacrylic acid, styrene, maleic acid or itaconic acid or, respectively, anhydrides thereof or vinylpyrrolidone. In this case the proportion of the comonomers ought to be not more than 30 wt %, preferably not more than 10 wt % of the two major constituents. Small amounts of crosslinking monomers, such as allyl acrylate, can additionally be used. The amounts ought, however, preferably to be not more than 0.05 wt % to 2.0 wt %.

The copolymerization mixture further comprises blowing agents which at temperatures of about to 300° C. either decompose or vaporize and in so doing form a gas phase.

The polymerization takes place usefully in block form in the presence of a radical polymerization initiator. In the production of flat blocks, e.g. in layers with thicknesses up to 80 mm, the monomer mixture is located between two glass plates, which are sealed at the edges and form a kind of flat chamber. This flat chamber is surrounded by a water bath, which is set to the desired polymerization temperature.

The polymerization can be carried out largely or over wide ranges under isothermal conditions, i.e. at constant water bath temperature. In many cases it is possible to keep the water bath temperature constant from the start to the end of the polymerization.

Optionally, however, the water bath temperature may also be kept constant initially for a long time and raised after a certain time, in order for part of the polymerization to be carried out at a higher temperature.

In this subsequent polymerization phase as well, carried out at a higher temperature, the water bath temperature can be kept constant.

The water bath temperature selected is dependent on the thickness of the polymerization chamber and on the formula used in the polymerization, especially on the initiators used. In this context it is generally advantageous to move the polymerization temperature and hence also the temperature of the water bath to lower figures as the thickness of the slab to be produced goes up.

The appropriate temperature for formula and thickness can be optimized in each case by means of simple preliminary tests.

It is self-evident that the temperature is adjusted for the thickness of the chamber and for the formula, within the limits set out above, in such a way that the heat given off in the polymerization can be adequately dissipated without unwanted temperatures occurring within the polymerization mixture during the polymerization. After the end of the polymerization process, which is controlled by the surrounding water bath, temperature conditioning is carried out in a heating cabinet. Temperature conditioning takes place in general at temperatures of 80 to 130° C.; here, as already observed, it is possible to set a temperature regime which rises at a uniform rate or in steps, beginning at 38° C., preferably beginning at the polymerization temperature. In general 10 to 1000 hours are sufficient for this final polymerization in the temperature-conditioning cabinet.

The Blowing Agents

Blowing agents (C) used may be the following compounds or mixtures thereof: formamide, formic acid, urea, itaconic acid, citric acid, dicyandiamide, water, monoalkylureas, dimethylurea, 5,5'-azobis-5-ethyl-1,3-dioxane, 2,2'-azobis-N-butylisobutyramide, 2,2'-azobis-N-diethylisobutyramide, 2,2',4,4,4',4'-hexamethyl-2,2'-azopentane, 2,2'-azobis-2-methylpropane, dimethyl carbonate, di-tert-butyl carbonate, acetone cyanohydrin carbonate, methyl hydroxyisobutyrate carbonate, N-methylurethane, N-ethylurethane, N-tert-butylurethane, urethane, oxalic acid, maleic acid, hydroxyisobutyric acid, malonic acid, cyanoformamide, dimethylmaleic acid, tetraethyl methanetetracarboxylate, n-butyl oxamate, trimethyl methanetricarboxylate, triethyl methanetricarboxylate, and also monohydric alcohols of 3 to 8 carbon atoms such as, for example, propan-1-ol, propan-2-ol, butan-1-ol, butan-2-ol, tert-butanol and isobutanol.

Besides these, copolymerizable blowing agents, which release a volatile compound under the conditions of foaming and in general thereafter remain in the form of repeating (meth)acrylic acid units in the polymer, are also used. Examples of such copolymerizable blowing agents, which are common knowledge, are isopropyl (meth)acrylate and tert-butyl (meth)acrylate.

The Initiators

Initiators used are compounds and initiator systems which are able to initiate radical polymerizations. Known classes of compound are peroxides, hydroperoxides, peroxodisulphates, percarbonates, perketals, peroxy esters, hydrogen peroxide and azo compounds. Examples of initiators are hydrogen peroxide, dibenzoyl peroxide, dicyclohexyl peroxodicarbonate, dilauryl peroxide, methyl ethyl ketone peroxide, acetylacetone peroxide, di-tert-butyl peroxide, tert-butyl hydroperoxide, cumene hydroperoxide, tert-butyl peroctanoate, tert-butyl per-2-ethylhexanoate, tert-butyl perneodecanoate, tert-amyl perpivalate, tert-butyl perpivalate, tert-butyl perbenzoate, lithium, sodium, potassium and ammonium peroxodisulphate, azoisobutyronitrile, 2,2-azobisiso-2,4-dimethylvaleronitrile, 2,2-azobisisobutyronitrile, 2,2'-azobis(2-amidinopropane) dihydrochloride, 2-(carbamoylazo)isobutyronitrile and 4,4'-azobis(cyanovaleric acid).

Likewise suitable are redox initiators (H. Rauch-Puntigam, Th. Völker, Acryl- and Methacrylverbindungen, Springer, Heidelberg, 1967 or Kirk-Othmer, Encyclopedia of Chemical Technology, Vol. 1, pages 286 ff, John Wiley & Sons, New York, 1978). It can be useful to combine initiators and initiator systems which have different decomposition properties in terms of time and temperature. The initiators are used preferably in amounts of 0.01 wt % to 2 wt %, more preferably of 0.15 wt % to 1.5 wt %, based on the total weight of the monomers.

The polymerization is accomplished preferably by way of variants of bulk polymerization, an example being the so-called chamber process described in the prior art, without being limited thereto.

One poly(meth)acrylimide foam which can be used and which is particularly preferred may be obtained, for example, through the following steps:

1.) producing a polymer slab by radical polymerization of a composition consisting of
   20 to 60 wt % of (meth)acrylonitrile,
   40 wt % to 78 wt % of (meth)acrylic acid,
   0 to 20 wt % of further monofunctional, vinylically unsaturated monomers
   one or more polyols in an amount such that the hydroxyl number of the mixture is between 0.0008 and 0.2 mol of OH groups/100 g of polymer, preferably between 0.001 and 0.1 mol of OH groups/100 g of polymer,
   1 wt % to 15 wt % of a blowing agent, of a copolymerizable blowing agent or of a blowing agent mixture,
   optionally 0 to 5 wt % of further crosslinkers,
   an initiator system and
   customary additional substances.

The further crosslinkers may comprise radically polymerizable, vinylically unsaturated compounds having at least 2 double bonds in the molecule, or metal-ionic compounds, more particularly magnesium oxide, in solution in the monomer mixture. With particular preference apart from the polyols there are no additional crosslinkers used or at most a total of 1 wt % of additional crosslinkers.

2.) This mixture is polymerized for between 10 hours and several days at a temperature—depending on the initiators used and on the thickness of material established, between 28° C. and 110° C., in a chamber formed from two glass plates, with a size for example of 50 cm*50 cm, and with an edge seal 2.2 cm thick. The polymer for final polymerization to the poly(meth)acrylimide is subsequently subjected for about 20 hours to a temperature-conditioning programme which extends from 40° C. to 130° C., the conditioning temperature lying below the foaming temperature established using the blowing agents employed. The subsequent foaming takes place for a number of hours at, for example, 190 to 250° C.

Optional Additional Substances for Poly(Meth)Acrylimides

The mixtures may further be admixed with customary additional substances. Suitable total amounts of adjuvants are, for example, 0 wt % to 20 wt %, 0 wt % to 10 wt % or 0 wt % to 5 wt %, based on the monomer mixture. The customary additional substances here are different from the stated monomers, crosslinker, blowing agents or initiators.

They include, among others, antistats, antioxidants, mould release agents, lubricants, dyes, flow improvers, fillers, light stabilizers and organic phosphorus compounds, such as phosphites or phosphonates, and pigments, release agents, weathering protectants and plasticizers. Further possible additions are flame retardants. As well as halogen-containing flame retardants, some of which contain antimony oxides, it is also possible for phosphorus-containing compounds to be used. Phosphorus-containing compounds are preferred on account of the lower toxicity of smoke gas in the event of fire. The phosphorus compounds include, among others, phosphanes, phosphane oxides, phosphonium compounds, phosphonates, phosphites and/or phosphates. These compounds may be organic and/or inorganic in nature, as for example phosphoric monoesters, phosphonic monoesters, phosphoric diesters, phosphonic diesters and phosphoric triesters, and also polyphosphates.

Conductive particles, which prevent electrostatic charging of the foams, are another class of preferred additional substances. They include, among others, metal particles and carbon black particles, which may also be present in the form of fibres, having a size in the range from 10 nm to 10 mm, as is described in EP 0 356 714 A1.

The rigid foams of the invention have a broad spectrum of possible uses. For example, they can be processed with outer layers, in the form for example of a sandwich structure or of a pultrudate filled with the rigid foam, as composite material. Alternatively, shaped parts without outer layers can also be cut from the rigid foam. A further possibility is to carry out only partial foaming of the foam, and to complete foaming in conjunction with shaping. Moreover, the foam can be granulated prior to foaming or produced directly in bead form, by means, for example, of polymerization in the form of a suspension polymerization. From ground material or suspension polymers of these kinds it is possible to produce bead foams and/or mouldings made from bead foams. By cutting or sawing, furthermore, thin foam slabs or sheets can be produced.

The foams obtainable in accordance with the invention are especially suitable as a component material in the production of space, air, water, rail and land vehicles, such as motor vehicles, pedal cycles or motor cycles. Further fields of application are the construction of wind power installations or sports equipment, such as skies, for example.

EXAMPLES 49 parts by weight of methacrylic acid, 50 parts by weight of methacrylonitrile, 7 parts by weight of tert-butanol, 2 parts by weight of tert-butyl methacrylate, 0.22 part by weight of MgO, 0.04 part by weight of tert-butyl perpivalate, 0.036 part by weight of tert-butyl per-2-ethylhexanoate, 0.1 part by weight of tert-butyl perbenzoate, 0.103 part by weight of cumyl perneodecanoate, 50 ppm of 1,4-benzoquinone and 0.3 part by weight of Moldwiz INT20E (release agent; manufacturer: Axel Plastics), and also the amounts of polyols specified in Table 1, were mixed and the mixture was stirred until a homogeneous solution was obtained. The solution was polymerized at 41° C. for hours between two glass plates, sealed by a surrounding sealing bead, to form 2 polymer slabs 3 mm thick. After cooling and removal from the glass plates, the polymer slabs were conditioned at 115° C. for 3 hours and then foamed in a forced-air oven at 215° C. for 2 hours. The densities obtained are shown in Table 1.

TABLE 1

| Example | Polyol | Amounts of polyol used (parts by weight) | Density [kg/m³] |
|---|---|---|---|
| comparative example 1 | — | 0 | 61 |
| example 1 | ethylene glycol | 0.2 | 70 |
| example 2 | ethylene glycol | 0.8 | 97 |
| example 3 | ethylene glycol | 1.5 | 109 |
| example 4 | 1,10-decanediol | 0.8 | 80 |
| example 5 | 1,10-decanediol | 1.5 | 91 |
| example 6 | glycerol | 0.8 | 97 |
| example 7 | polyTHF2000 | 2 | 63 |
| example 8 | polyTHF2000 | 5 | 71 |

The formulations of the examples differ only in the nature and amount of the polyols used. It is evident that the nature and amount of the polyol used has a significant effect on the density of the PMI foam (for identical foaming temperature and foaming time [2 h]). The density of the end-product foam can therefore be adjusted merely by varying the amount and/or nature of the crosslinker.

The invention claimed is:

1. A method for producing a foam of poly(meth)acrylimide, the method comprising:
   polymerizing a mixture comprising (meth)acrylonitrile, (meth)acrylic acid, a polyol having between 2 and 10 hydroxyl groups, at least one initiator and at least one blowing agent to form a slab or a powder,
   optionally temperature-conditioning the mixture, and
   then foaming the mixture at a temperature between 120 and 300° C U,
   wherein crosslinking does not occur until during foaming.

2. The method according to claim 1, wherein an amount of the polyol in the mixture is selected such that a hydroxyl number of the mixture is between 0.0008 and 0.2 mol of OH groups/100 g of polymer.

3. The method according to claim 1, wherein the polyol is a diol or a higher polyol.

4. The method according to claim 3, wherein the diol or the high polyol is ethylene glycol, 1,10-decanediol, beta-hydroxyalkylamides, OH-telechelic polytetrahydrofuran having an average molar mass between 500 and 8000 g/mol, or comprises an OH-telechelic polyolefin, a polycarbonate, a polyoxymethylene, a polyethylene glycol, a polypropylene glycol, a polyglycerol or a polyester each having a molar mass between 200 and 10 000 g/mol.

5. The method according to claim 1, wherein the polyol comprises glycerol, pentaerythritol, xylitol, alditols or another sugar alcohol.

6. The method according to claim 1, wherein
   an amount of the polyol in the mixture is selected such that a hydroxyl number of the mixture is between 0.001 and 0.1 mol of OH groups/100 g of polymer.

7. The method according to claim 1, wherein the mixture consists of
   20 to 60 wt % of (meth)acrylonitrile,
   40 wt % to 78 wt % of (meth)acrylic acid,
   0 to 20 wt % of further monofunctional, vinylically unsaturated monomers,
   one or more polyols in an amount such that a hydroxyl number of the mixture is between 0.0008 and 0.2 mol of OH groups/100 g of polymer,
   1 wt % to 15 wt % of a blowing agent, of a copolymerizable blowing agent or of a blowing agent mixture,
   optionally 0 to 5 wt % of further crosslinkers,
   an initiator system, and
   customary additional substances.

8. A space, air, water, rail or land vehicle, a wind turbine or sports equipment, comprising: a foam of poly(meth)acrylamide obtained from the method according to claim 1.

9. A bead foam, sandwich material, or pultrudate, comprising: a foam of poly(meth)acrylamide obtained from the method according to claim 1.

10. A space, air, water, rail or land vehicle, a wind turbine or sports equipment, comprising: the bead foam, sandwich material, or pultrudate according to claim 9.

* * * * *